(12) United States Patent
Wada et al.

(10) Patent No.: US 7,254,107 B2
(45) Date of Patent: Aug. 7, 2007

(54) OPTICAL HEAD AND OPTICAL RECORDING AND REPRODUCING APPARATUS

(75) Inventors: Hidenori Wada, Uji (JP); Tomotada Kamei, Neyagawa (JP); Sadao Mizuno, Ibaraki (JP); Hideki Hayashi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 547 days.

(21) Appl. No.: 10/817,836

(22) Filed: Apr. 6, 2004

(65) Prior Publication Data
US 2005/0058052 A1   Mar. 17, 2005

(30) Foreign Application Priority Data
Apr. 7, 2003   (JP) .............................. 2003-102609

(51) Int. Cl.
  *G11B 7/00* (2006.01)
(52) U.S. Cl. .............................. 369/112.02; 369/112.07
(58) Field of Classification Search ............ 369/44.23, 369/44.24, 112.01, 112.02, 112.07, 112.23, 369/112.26
See application file for complete search history.

(56) References Cited

U.S. PATENT DOCUMENTS

| | | | |
|---|---|---|---|
| 6,115,336 A | 9/2000 | Okada | |
| 6,498,330 B1 | 12/2002 | Yoshida | |
| 6,721,259 B1 * | 4/2004 | Yamamoto et al. | 369/112.26 |
| 7,054,252 B2 * | 5/2006 | Sato et al. | 369/112.01 |
| 2002/0036958 A1 | 3/2002 | Wada et al. | |

FOREIGN PATENT DOCUMENTS

| | | |
|---|---|---|
| CN | 1229231 | 9/1999 |
| CN | 1229234 | 9/1999 |
| JP | 10-334575 | 12/1998 |
| JP | 11-344666 | 12/1999 |
| JP | 2000-171346 | 6/2000 |
| JP | 2000-171349 | 6/2000 |
| JP | 2002-109776 | 4/2002 |

\* cited by examiner

*Primary Examiner*—Nabil Hindi
(74) *Attorney, Agent, or Firm*—Wenderoth, Lind & Ponack, L.L.P.

(57) ABSTRACT

An optical head is provided with: an objective-lens-use opening that determines an aperture of the objective lens; a light-source light-quantity controlling opening that aperture-controls light that has been separated by the light separation device; a light detector that receives light that has been aperture-controlled by the light-source light-quantity controlling opening; and a light detector that receives light that has been reflected by the optical recording medium, and has an arrangement in which: the length of the optical light path from the spherical aberration correcting device to the objective-lens-use opening is made virtually the same as a length of the optical light path from the spherical aberration correcting device to the light-source light-quantity controlling opening, and the aperture of the light-source light-quantity controlling opening has virtually the same size as the aperture of the objective-lens-use opening. The objective of the present invention is to provide an optical head in which a signal outputted from the light quantity detection device is unchanged even when the spherical aberration correcting device is driven so that by using this signal, the quantity of light from the light source is set to an appropriate value.

28 Claims, 11 Drawing Sheets

OPTICAL HEAD AND OPTICAL RECORDING AND REPRODUCING APPARATUS

BACKGROUND OF THE INVENTION

1. Field of the Invention

The present invention relates to an optical head used in optical information processing, optical communication or the like and an optical recording and reproducing apparatus using the optical head.

2. Description of the Related Art

Recently, a digital versatile disc (DVD) has attracted attention as a high-capacity optical recording medium because it can record digital information in a recording density which is about 6 times as high as a compact disc (CD). However, a further high-density optical recording medium is demanded as capacity of information becomes large. Here, in order to realize a density higher than the DVD (wavelength is 660 nm and numerical aperture (NA) is 0.6), it is necessary to use a light source emitting a light having shorter wavelength and to further increase the NA of the objective lens. For example, when blue laser having a wavelength of 405 nm and an objective lens having NA of 0.85 are used, a recording density which is 5 times as high as the DVD can be attained.

However, since the high-density optical recording medium apparatus using the blue laser has very strict reproducing and/or recording margin, in other words, a permissible level for a fluctuation of characteristic in reproducing or recording is limited very strictly, aberration generated by a fluctuation in the base-substrate thickness of an optical recording medium becomes a problem. It is to be noted that the wording "reproducing and/or recording" means "at least one of reproducing and recording", in the specification, to simplify the description.

In relating to this problem, Japanese Patent Laid-open Publication No. 2000-131603 discloses an optical head which aims to carry out reproducing and recording operations while correcting aberration due to a fluctuation in the base-substrate thickness of an optical recording medium.

One example of the above conventional optical head is described with reference to the drawing.

FIG. 9 is a schematic view showing a constitution of the conventional optical head. In FIG. 9, reference numeral 91 designates a light source, reference numeral 92 designates a diffraction grating, reference numeral 93 designates is a collimator lens, reference numeral 94 designates a polarized beam splitter, reference numeral 95 designates a ¼ wavelength plate, reference numeral 96 designates a group of aberration correcting lenses, reference numeral 97 designates an objective lens, reference numeral 98 designates an optical recording medium, reference numeral 99 designates a focusing lens, reference numeral 100 designates a multi-lens and reference numeral 101 designates a light detector.

The light source 91, which is a semiconductor laser, serves as a light source that outputs coherent light for use in recording and reproducing to a recording layer of the optical recording medium 98. The diffraction grating 92 has a structure in which a concave/convex pattern is formed on a surface of a glass substrate, and serves an optical element which divides an incident beam into three beams so as to allow detection of a tracking error signal through a so-called three beam method. The collimator lens 93 is a lens which converts diverged light emitted from the light source 91 to parallel light rays. The polarized beam splitter 94 is an optical element which has different transmittance and reflection factor depending on incident polarized light, and is used for separating light. The ¼ wavelength plate 95 is made from a birefringence material, and serves as an optical element that converts linearly polarized light to circularly polarized light.

The group of aberration correcting lenses 96, which is used for correcting spherical aberration that occurs when the base-substrate thickness of the optical recording medium 98 is different from a predetermined standard value, is constituted by a group of concave lenses 96a and a group of convex lenses 96b as well as a uniaxial actuator, not shown. And, by changing the distance between the group of concave lenses 96a and the group of convex lenses 96b, it becomes possible to correct the spherical aberration. The above-mentioned standard value is, more preferably, determined based on an optimum design base-substrate thickness as a thickness of the base-substrate of the optical recording medium 98. The group of aberration correcting lenses 96 will be described later in detail The objective lens 97 is a lens for converging light on a recording layer of the optical recording medium 98. The focusing lens 99 is a lens used for converging light reflected from the recording layer of the optical medium 98 onto the light detector 101. The multi-lens 100 has a cylindrical surface as its light incident face, and its light-releasing face forms a rotation symmetrical face with respect to the lens light axis so that astigmatism, which allows the detection of a focus error signal with respect to incident light through a so-called astigmatism method, is given. The light detector 101 receives light reflected by the recording layer of the optical recording medium 98 to convert the light to an electric signal.

The following description will discuss operations of the optical head having the above-mentioned arrangement. Linearly polarized light, emitted from the light source 91, is divided into three beams by the diffraction grating 92, and the three divided light beams are converted to parallel light rays by the collimator lens 93. The resulting parallel light rays are allowed to pass through the polarized beam splitter 94, and made incident on the ¼ wavelength plate 95 so that the linearly polarized light is converted into circularly polarized light. The circularly polarized light that has passed through the ¼ wavelength plate 95 is made incident on the group of aberration correcting lenses 96. In this case, in order to correct spherical aberration that occurs when the base-substrate thickness of the optical recording medium 98 deviates from an standard thickness, the incident parallel light rays are converted to diverging light and converging light by changing the distance between the group of concave lenses 96a and the group of convex lenses 96b that constitute the group of aberration correcting lenses 96. Then, the converted light is made incident on the objective lens 97 so that spherical aberration is generated in proportion to a degree of divergence or a degree of convergence of the incident light, and is converged on the optical recording medium 98.

Here, since light having wave aberration capable of correcting the wave aberration occurring upon deviation in the base-substrate thickness of the optical recording medium 98 from the standard base-substrate thickness is converged thereon by the objective lens 97, a light spot that is free from aberration, that is, a light spot that is limited to the diffraction limit, is formed on the optical recording medium 98. Next, the circularly polarized light, reflected from the optical recording medium 98, is allowed to pass through the group of aberration correcting lenses 96, and is input to the ¼ wavelength plate 95, then is converted to linearly polarized light in a direction orthogonal to the linearly polarized light that has been emitted from the light source 91. The linearly polarized light, converted by the ¼ wavelength plate 95, is reflected by the polarized beam splitter 94, and converged by the focusing lens 99 without returning to the light source 91 so that astigmatism is given to the light made incident by the multi-lens 100 and the resulting light is converged on the light detector 101. The light detector 101 outputs a focus error signal that indicates a focused state of light on the optical recording medium 98, and also outputs a tracking error signal that indicates an irradiation position of light.

Here, the focus error signal and the tracking error signal are detected by known techniques such as an astigmatism method and a three beam method. Based upon the focus error signal, a focus control device, not shown, controls the position of the objective lens 97 in the light axis direction so that the light is always converged on the optical recording medium 98 in the focused state. Moreover, based upon the tracking error signal, a tracking control device, not shown, controls the position of the objective lens 97 so that light is converged on a desired track on the optical recording medium 98. Furthermore, information recorded on the optical recording medium 98 is also obtained by the light detector 101.

Here, the following description will discuss the spherical aberration correcting operation that is available by the use of the group of aberration correcting lenses 96, in detail. When the distance between the group of concave lenses 96a and the group of convex lenses 96b constituting the group of aberration correcting lenses 96 is narrowed, the parallel light rays are converted to diverging light, and when the distance is widened, the parallel light rays are converted to converging light. In other words, by changing the distance between the group of concave lenses 96a and the group of convex lenses 96b, it is possible to generate light rays having power components with different codes. Here, in the case when light having a power component is made incident on the objective lens 97, spherical aberration occurs in the light converged by the objective lens 97, and since the code is dependent on the code of the incident power component, it is possible to correct the spherical aberration that occurs upon deviation of the base-substrate thickness of the optical recording medium 98 from a standard base-substrate thickness by using this spherical aberration.

With this arrangement, since the spherical aberration caused by the deviation in the base-substrate thickness of the optical recording medium 98 can be corrected by using the group of aberration correcting lenses 96, it is possible to carry out stable reproducing and recording operations.

In the optical head having the above-mentioned conventional arrangement, however, no description has been given to a light-quantity detection device that is required to control the quantity of light released from the light source 91, with the result that a problem arises due to the position of this light-quantity detection device. Referring to FIG. 10, the following description discusses this problem in detail. Here, only the points in which an optical head shown in FIG. 10 is different from the optical head of FIG. 9 are that a mirror and a light-quantity detection device are further installed and that the ¼ wavelength plate is placed between the mirror and the objective lens; except for these points, it has the same arrangement as the optical head of FIG. 9. Therefore, in FIG. 10, the same parts as those of the optical head of FIG. 9 are used, unless otherwise indicated, and those components indicated by the same reference numerals have the same functions, unless otherwise indicated.

In FIG. 10, reference numeral 201 is a mirror, reference numeral 202 is a condenser lens and reference numeral 203 is a light-source light-quantity controlling light detector. Here, the light-quantity detection device is constituted by the condenser lens 202 and the light-quantity controlling light detector 203.

The mirror 201 is an optical element that reflects incident light to direct the resulting light to the optical recording medium 98, and with respect to certain linearly polarized light, transmits 5% thereof, while reflecting 95% thereof, and with respect to linearly polarized light orthogonal to the above-mentioned linearly polarized light, reflects 100% thereof.

The following description will discuss operations of the optical head having the above-mentioned arrangement. Linearly polarized light, released from the light source 91, is divided into three beams by the diffraction grating 92, and the three divided light beams are converted to parallel light rays by the collimator lens 93. The light, converted into the parallel light rays, are allowed to pass through the polarized beam splitter 94, and made incident on the group of aberration correcting lenses 96. In this case, in order to correct spherical aberration that occurs when the base-substrate thickness deviates from a standard value, the incident parallel light rays are converted to diverging light and converging light by changing the distance between the group of concave lenses 96a and the group of convex lenses 96b that constitute the group of aberration correcting lenses 96; thus, the converted light is made incident on the mirror 201 so that one portion (5%) thereof is allowed to transmit, while most (95%) of it is reflected, and changed in its advancing direction to the optical recording medium 98. This reflected light is made incident on the ¼ wavelength plate 95 to be converted from linearly polarized light to circularly polarized light; thus, this circularly polarized light is made incident on the objective lens 97 so that spherical aberration is generated in proportion to a degree of divergence or a degree of convergence of the incident light, and is further converged on the optical recording medium 98. Here, since light having wave aberration capable of correcting the wave aberration occurring upon deviation in the bas-substrate thickness of the optical recording medium 98 from the standard thickness is converged thereon by the objective lens 97, a light spot that is free from aberration, that is, a light spot that is limited to the diffraction limit, is formed on the optical recording medium 98.

Next, the circularly polarized light, reflected from the optical recording medium 98, is inputted to the ¼ wavelength plate 95, and converted to linearly polarized light in a direction orthogonal to the linearly polarized light released from the light source 91. The linearly polarized light converted by the ¼ wavelength plate 95 is all reflected by the mirror 201, allowed to pass through the group of aberration correcting lenses 96, and reflected by the polarized beam splitter 94 and further converged by the focusing lens 99 without returning to the light source 91 so that astigmatism is given to the light made incident by the multi-lens 100 and the resulting light is converged on the light detector 101.

The light detector 101 outputs a focus error signal that indicates a focused state of light on the optical recording medium 98, and also outputs a tracking error signal that indicates an irradiation position of light. Here, the focus error signal and the tracking error signal are detected by known techniques such as an astigmatism method and a three beam method. Based upon the focus error signal, a focus control device, not shown, controls the position of the objective lens 97 in the light axis direction so that the light is always converged on the optical recording medium 98 in the focused state. Moreover, based upon the tracking error signal, a tracking control device, not shown, controls the position of the objective lens 97 so that light is converged on a desired track on the optical recording medium 98.

Furthermore, information recorded on the optical recording medium 98 is also obtained by the light detector 101. Moreover, the light that has passed through the mirror 201 is converged on the light-source light-quantity controlling light detector 203 by the condenser lens 202, and the light-source light-quantity controlling light detector 203 outputs an electric signal corresponding to the quantity of light released from the light source 1.

The necessity of the above-mentioned light-quantity detection device is explained as follows: Since the light source 91 is formed by a semiconductor laser, the light source 91 has a temperature rise when it continues to output light, with the result that the quantity of light to be outputted from the light source 91 tends to vary even when the current used for controlling the light source 91 is constant. Therefore, by detecting one portion of the light released from the light source 91, it becomes possible to control the quantity of light released from the light source 91.

However, in the case when the signal detected by the light-quantity detection device is varied independent of the quantity of light from the light source 91, a serious problem is raised. For example, even in the case of constant quantity of light from the light source 91, when the signal outputted from the light quantity detection device becomes smaller, the light source 91 is controlled so as to release a greater quantity of light, with the result that a great quantity of light is released during a reproducing operation of the optical recording medium 98 to cause erroneous erasing of information recorded in the optical recording medium 98. In contrast, even in the case of constant quantity of light from the light source 91, when the signal outputted from the light quantity detection device becomes greater, the light source 91 is controlled so as to release a smaller quantity of light, with the result that the quantity of light fails to reach a sufficient quantity required for recording during a recording operation on the optical recording medium 98 to cause an insufficient recording process. In other words, a serious problem is raised unless the signal detected by the light-quantity detection device varies in response to the quantity of light released from the light source 91.

FIG. 11 schematically shows light to be made incident on the objective lens 97 when the group of aberration correcting lenses 96 is driven to correct spherical aberration. In FIG. 11, in the case when the base-substrate thickness of the optical recording medium 98 is thicker than a standard thickness, the distance between the group of concave lenses 96a and the group of convex lenses 96b becomes wider so that the light is made incident on the objective lens 97 as converged light. This state is indicated by a solid line. In the case when the base-substrate thickness of the optical recording medium 98 is thinner than the standard base-substrate thickness, the distance between the group of concave lenses 96a and the group of convex lenses 96b becomes smaller so that the light is made incident on the objective lens 97 as diverged light. This state is indicated by an imaginary line. Here, it is supposed that the light to be used in the light-quantity detection device is located at position A in FIG. 11.

In FIG. 10, an aperture (not shown), which is used for controlling the quantity of transmitted light, is formed between the mirror 201 and the condenser lens 202, and this is schematically indicated as an aperture 110H (opening) in FIG. 11. This aperture 110H is provided by forming a hole (opening) in a plate member 110. The member 110 having aperture 110H may be a hold member for holding the group of convex lenses 96b.

As shown by FIG. 11, although the group of aberration correcting lenses is designed so as to make the quantity of incident light onto the objective lens 97 constant independent of the location of the group of concave lenses 96a while the group of concave lenses 96a is shifted to correct spherical aberration, the light to be made incident on the light-source light-quantity controlling light detector 203 is shield by the member 110 having the aperture 110H on the peripheral portion thereof depending on the position of the group of concave lenses 96a, with the result that the quantity of light to be detected by the light-source light-quantity controlling light detector 203 is varied.

In other words, although the quantity of light of the light source 91 is not changed, the quantity of light to be made incident on the light-source light-quantity controlling light detector 203 is varied, as described above, with the result that a signal is outputted as if it were derived from a change in the quantity of light in the light source; consequently, problems are raised in that recorded information is erased during reproducing, and in that insufficient recording is caused due to a failure in outputting a sufficient quantity of light upon recording.

SUMMARY OF THE INVENTION

The present invention has been devised to solve the above-mentioned conventional problems, and its first objective is to provide an optical head in which a signal, outputted from the light-source light-quantity controlling light detector 203, is only dependent on a quantity of light to be released from the light source even when spherical aberration has been corrected.

Moreover, a second objective of the present invention is to provide an optical recording/reproducing apparatus makes it possible to detect a quantity of light to be released from the light source accurately even in the case when there is a deviation from a standard value in the base-substrate thickness of the optical recording medium and spherical aberration caused by the deviation has been corrected, and consequently to carry out stable reproducing and recording operations.

In order to achieve the above-mentioned objectives, an optical head of the present invention, which records and/or reproduces a signal on or from an optical recording medium, is provided with: a light source; an objective lens that converges light released from the light source onto the optical recording medium; an objective-lens-use opening that determines an aperture of the objective lens; a spherical aberration correcting device that corrects spherical aberration that occurs when the optical recording medium has a base-substrate thickness that deviates from a standard base-substrate thickness; a light separation device that is placed in a light path from the spherical aberration correcting device to the optical recording medium; a light-source light-quantity controlling opening that aperture-controls light that has been separated by the light separation device; a first light detector that receives light that has been aperture-controlled by the light-source light-quantity controlling opening; and a second light detector that receives light that has been reflected by the optical recording medium, and in this arrangement, a length of the optical light path from the spherical aberration correcting device to the objective-lens-use opening is made substantially the same as a length of the optical light path from the spherical aberration correcting device to the light-source light-quantity controlling opening, and the aperture of the light-source light-quantity controlling opening substantially has the same size as the aperture of the objective-lens-use opening.

With this arrangement, even when the spherical aberration correcting device is driven, the signal to be outputted by the first light detector that receives light that has been aperture-controlled by the light-source light-quantity controlling opening is prepared as a signal that corresponds to only the quantity of light released from the light source; thus, since the light source can be controlled by using this signal, it becomes possible to carry out stable reproducing and recording operations.

Also, in order to achieve the above-mentioned objectives, another optical head of the present invention, which records and/or reproduces a signal on or from an optical recording medium, is provided with: a light source; an objective lens that converges light released from the light source onto the optical recording medium; a spherical aberration correcting device that corrects spherical aberration that occurs when the optical recording medium has a base-substrate thickness that deviates from a standard base-substrate thickness; a light separation device that is placed in a light path from the spherical aberration correcting device to the optical recording medium; a lens that converges light that has been separated by the light separation device; a light-source light-quantity controlling opening that aperture-controls light that has been converged by the lens; a first light detector that receives light that has been aperture-controlled by the light-source light-quantity controlling opening; and a second light detector that receives light that has been reflected by the optical recording medium.

With this arrangement, even when the spherical aberration correcting device is driven, a signal, outputted by the first light detector that receives light that is aperture-controlled by the light-source light-quantity controlling opening, is prepared as a signal that corresponds to only the quantity of light released from the light source; thus, it is possible to control the light source by using this signal, and consequently to carry out stable reproducing and recording operations. Moreover, since the distance from the spherical aberration correcting device to the light detector that receives light that has been aperture-controlled by the light-source light-quantity controlling opening can be shortened, it becomes possible to miniaturize the optical head effectively.

In order to achieve the above-mentioned objectives, another optical head of the present invention, which records or reproduces a signal on or from an optical recording medium, is provided with: a light source; an objective lens that converges light released from the light source onto the optical recording medium; a spherical aberration correcting device that corrects spherical aberration that occurs when the optical recording medium has a base-substrate thickness that deviates from a standard base substrate thickness; a light separation device that is placed in a light path from the light source to the spherical aberration correcting devise; a first light detector that receives light that has been separated by the light separation device; and a second light detector that receives light that has been reflected by the optical recording medium. With this arrangement, even when the spherical aberration correcting device is driven, the signal to be outputted by the first light detector that receives light separated by the light separation device is prepared as a signal that corresponds to only the quantity of light released from the light source; thus, it becomes possible to control the light source by using this signal, and consequently to carry out stable reproducing and recording operations.

In the above-mentioned optical head, the spherical aberration correcting device is preferable to correct the spherical aberration by the spherical aberration correcting device generates at least one of converging light and diverging light. More specifically, the spherical aberration correcting device is more preferably constituted by a group of positive lenses and a group of negative lenses. With this arrangement, spherical aberration that occurs when the base-substrate thickness of the optical recording medium deviates from the standard base-substrate thickness can be corrected in both of the forward path and return path of the optical head; thus, it becomes possible to obtain a stable control signal and reproducing signal.

In the above-mentioned optical head, the spherical aberration correcting device is preferably prepared as an optical element having a phase change layer placed between a pair of substrates having transparent conductive thin films. Since this arrangement allows miniaturization of the spherical aberration correcting device, it becomes possible to miniaturize the optical head effectively.

In the above-mentioned optical head, light that is made incident on the phase change layer is converted to diverging light or converging light by the phase change layer. With this arrangement, it is possible to prevent degradation in the spherical aberration correcting function even when the lens is shifted.

In the above-mentioned optical head, the optical head is preferably provided with a base-substrate thickness detection device that detects a base substrate thickness of the optical recording medium. Since this arrangement makes it possible to detect a deviation in the base-substrate thickness of the optical recording medium from the standard value at any position on the optical recording medium, it is possible to correct spherical aberration with higher precision, and consequently to obtain a stable control signal and reproduced signal.

In the above-mentioned optical head, the base-substrate thickness detection device is preferably provided with: a light source; a lens that converges light released from the light source on the optical recording medium; and a light detector that detects light that has been reflected by the optical recording medium. With this arrangement, since the aberration derived from the base-substrate thickness of the optical recording medium is detected by using another optical system, it is possible to detect the aberration derived from the base-substrate thickness of the optical recording medium simultaneously during a reproducing or recording operation.

In the above-mentioned optical head, the base-substrate thickness detection device detects information relating to the base-substrate thickness based upon two focal points of a first light ray on the side closer to a light axis of light and a second light ray on the outside of the first light ray. With this arrangement, it is possible to miniaturize the optical head.

In the above-mentioned optical head, the objective lens preferably has an NA of not less than 0.6. With this arrangement, in an attempt to achieve higher density in the case of a small aberration margin with respect to recording and reproducing operations, the optical recording medium is allowed to have an expanded tolerance for the deviation of the base-substrate thickness from the standard value. Therefore, it becomes possible to achieve a higher recording density.

In the above-mentioned optical head, the light source preferably has a wavelength of not more than 450 nm. With this arrangement, in an attempt to achieve higher density in the case of a small aberration margin with respect to recording and reproducing operations, the optical recording medium is allowed to have an expanded tolerance for the deviation of the base-substrate thickness from the standard base-substrate thickness. Therefore, it becomes possible to achieve a higher recording density.

In order to achieve the above-mentioned objectives, an optical recording/reproducing apparatus, which records and/or reproduces a signal on or from an optical recording medium, is provided with the optical head having the above-mentioned arrangement for recording or reproducing a signal on or from an optical recording medium. This apparatus makes it possible to detect a signal corresponding to the quantity of light released from a light source even when the spherical aberration correcting device is driven, and consequently to control the light source by using this signal; thus, it becomes possible to carry out stable reproducing and recording operations.

DETAILED DESCRIPTION OF THE INVENTION

Referring to Figures, the following description will discuss embodiments of the present invention.

EMBODIMENT 1

Embodiment 1 discusses one example of an optical head of the present invention.

Figure 1:
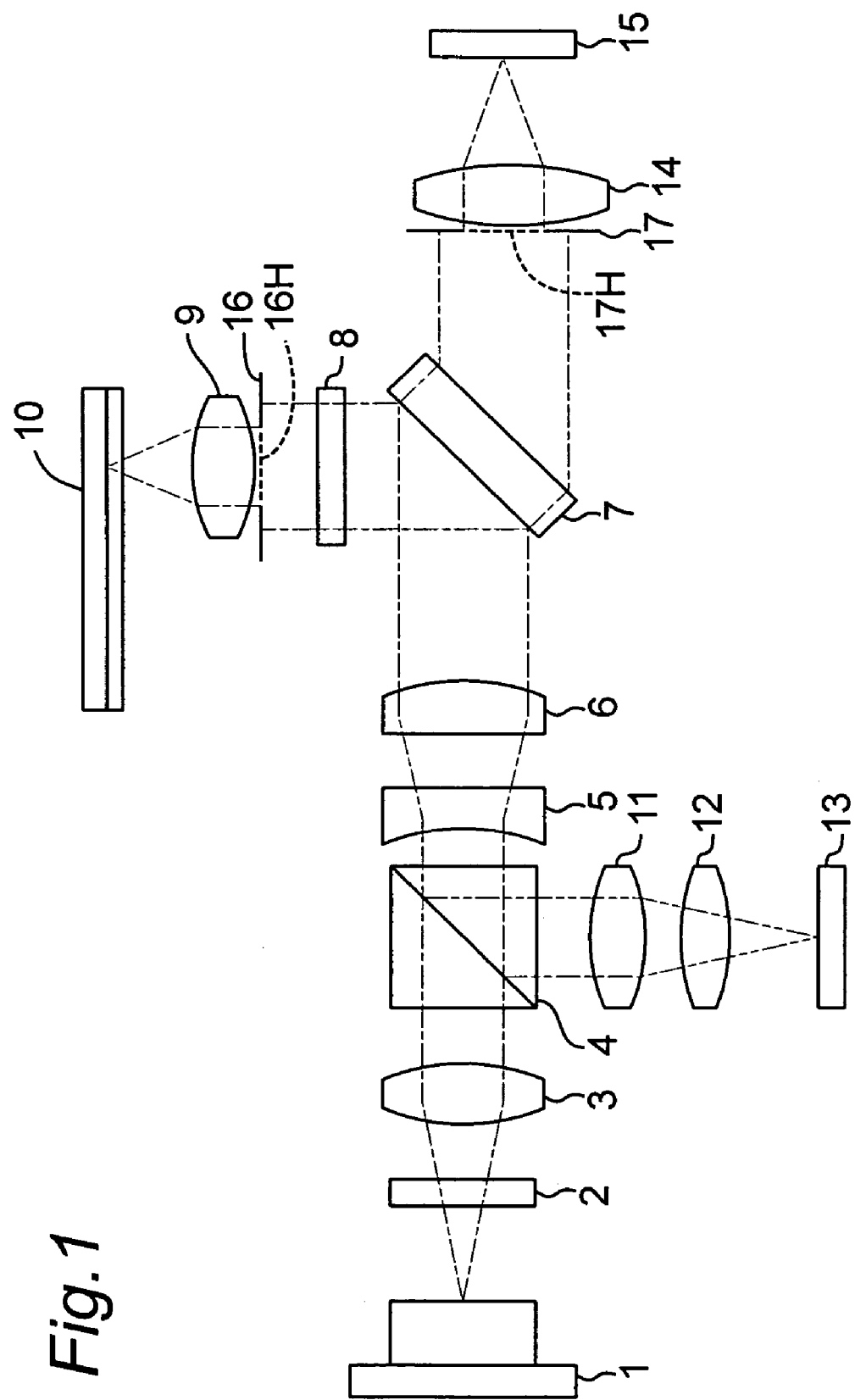
FIG. 1 is a schematic drawing that shows an optical head in accordance with a first embodiment of the present invention.

FIG. 1 is a block diagram that shows an optical head of embodiment 1. In FIG. 1, reference numeral 1 is a light source, reference numeral 2 is a diffraction grating, reference numeral 3 is a collimator lens, reference numeral 4 is a polarized beam splitter, reference numeral 5 is a concave lens, reference numeral 6 is a convex lens, reference numeral 7 is a mirror, reference numeral 8 is a ¼ wavelength plate, reference numeral 9 is an objective lens, reference numeral 10 is an optical recording medium, reference numeral 11 is a condenser lens, reference numeral 12 is a cylindrical lens, reference numeral 13 is a light detector (a second light detector), reference numeral 14 is a lens, reference numeral 15 is a light-source light-quantity controlling light detector (a second light detector), reference numeral 16 is an member having an objective-lens-use opening 16H and reference numeral 17 is a member having a light-source light-quantity controlling opening 17H.

In this structure, the concave lens 5, the convex lens 6 and a uniaxial actuator, not shown, constitute a spherical aberration correcting device; the lens 14, the light-source light-quantity controlling light detector 15 and the light-source light-quantity controlling opening 17 constitute a light-quantity detection device; the concave lens 5 corresponds to a group of negative lenses; the convex lens 6 corresponds to a group of positive lenses; and the mirror 7 forms a light separation device. That is, in this case, the group of negative lenses is constituted by a concave lens 5, and the group of positive lenses is constituted by a convex lens 6.

The light source 1, which is constituted by, for example, a GaN-based semiconductor laser element (wavelength: 405 nm), serves as a light source that outputs coherent light for use in recording and reproducing on and from a recording layer of the optical recording medium 10. The diffraction grating 2 has a structure in which a concave/convex pattern is formed on the surface of a glass substrate, and serves an optical element which divides an incident beam into three beams so as to allow detection of a tracking error signal through a so-called three beam method. The collimator lens 3 is a lens which converts diverged light released from the light source 1 to parallel light rays. The polarized beam splitter 4 is an optical element which has different transmittance and reflection factor depending on the polarizing direction of incident light, and is used for separating light rays. The spherical aberration correcting device, which is used for correcting spherical aberration that occurs when the base-substrate thickness of the optical recording medium 10 deviates from an standard base-substrate thickness as described in detail in relating to the prior art, is constituted by the concave lens 5, the convex lens 6 and the uniaxial actuator (a lens position changing device), not shown, and makes it possible to correct the above-mentioned spherical aberration by changing the distance between the concave lens 5 and the convex lens 6.

The mirror 7 serves as an optical element which reflects incident light to direct the resulting light to the optical recording medium 10, and with respect to certain linearly polarized light, transmits 5% thereof, while reflecting 95% thereof, and with respect to linearly polarized light orthogonal to the above-mentioned linearly polarized light, reflects 100% thereof. The ¼ wavelength plate 8 is formed by a birefringence material, and serves an optical element which converts linearly polarized light to circularly polarized light. The objective lens 9 serves as a lens for converging light onto the recording layer of the optical recording medium 10, and has a numerical aperture (NA) of 0.85. The condenser lens 11 is a lens which converges light that has been reflected by the recording layer of the optical recording medium 10 on the light detector 13 (the second light detector). The cylindrical lens 12 has a cylinder face in its light incident face, and its light-releasing face forms a rotation symmetrical face with respect to the lens light axis so that astigmatism that allows the detection of a focus error signal with respect to the incident light through a so-called astigmatism method is given. The light detector 13 receives light reflected by the recording layer of the optical recording medium 10 to convert the light to an electric signal.

The lens 14 converges light that has passed through the mirror 7 on the light-source light-quantity controlling light detector 15 (the first light detector). The objective-lens-use opening 16H is used to limit the size of light that is made incident on the objective lens so as to determine the NA of the objective lens, and a member for holding the objective lens 9 is also used as the member 16 having the opening (the objective-lens-use opening 16H). The light-source light-quantity controlling opening 17H is used to limit the quantity of light to be used for controlling the quantity of light of the light source, and a member for holding the lens 14 also forms the member 17 having the opening (the light-source light-quantity controlling opening 17H).

In the present embodiment, the light-source light-quantity controlling opening 17H is placed with the same length of light path as that from the spherical aberration correcting device to the objective-lens-use opening 16H, with the size of the opening being set to the same size as the objective-lens-use opening 16H.

The following description will discuss operations of the optical head having the above-mentioned arrangement. Linearly polarized light, released from the light source 1, is divided into three beams by the diffraction grating 2, and the three divided light beams are converted to parallel light rays by the collimator lens 3. The light, converted into the parallel light rays, are allowed to pass through the polarized beam splitter 4, and made incident on the spherical aberration correcting device. In this case, in order to correct spherical aberration that occurs when the base-substrate thickness deviates from a standard base-substrate thickness, the incident parallel light rays are converted to diverging light and converging light by changing the distance between the concave lens 5 and the convex lens 6 that constitute the spherical aberration correcting device; thus, the converted light is made incident on the mirror 7 so that one portion thereof is allowed to transmit, while most of it is reflected, and changed in its advancing direction to the optical recording medium 10.

This reflected light is made incident on the ¼ wavelength plate 8 to be converted from linearly polarized light to circularly polarized light; thus, this circularly polarized light is aperture-controlled by the objective-lens-use opening 16H, and made incident on the objective lens 9 so that spherical aberration is generated in proportion to a degree of divergence or a degree of convergence of the incident light, and is further converged on the optical recording medium 10. Here, since light having wave aberration capable of correcting the wave aberration occurring upon deviation in the base-substrate of the optical recording medium 10 from the standard value is converged thereon by the objective lens 9, a light spot that is free from aberration, that is, a light spot that is limited to the diffraction limit, is formed on the optical recording medium 10.

Next, the circularly polarized light, reflected from the optical recording medium 10, is inputted to the ¼ wavelength plate 8, and converted to linearly polarized light in a direction orthogonal to the linearly polarized light released from the light source 1. The linearly polarized light converted by the ¼ wavelength plate 8 is all reflected by the mirror 7, allowed to pass through the spherical aberration correcting device, and reflected by the polarized beam splitter 4 and further converged by the condenser lens 11 without returning to the light source 1 so that astigmatism is given to the light by the cylindrical lens 12, and the resulting light is converged on the light detector 13. The light detector 13 outputs a focus error signal that indicates the focused state of light on the optical recording medium 10, and also outputs a tracking error signal that indicates the irradiation position of light.

Here, the focus error signal and the tracking error signal are detected by known techniques such as an astigmatism method and a three beam method. Based upon the focus error signal, a focus control device, not shown, controls the position of the objective lens 9 in the light axis direction so that the light is always converged on the optical recording medium 10 in the focused state. Moreover, based upon the tracking error signal, a tracking control device, not shown, controls the position of the objective lens 9 so that light is converged on a desired track on the optical recording medium 10. Furthermore, information recorded on the optical recording medium 10 is also obtained by the light detector 13. Moreover, the light that has passed through the mirror 7 is converged on the light-source light-quantity controlling light detector 15, and the light-source light-quantity controlling light detector 15 outputs an electric signal corresponding to the quantity of light released from the light source 1.

Here, the following description will discuss the light-quantity detection device in detail. As described in the background of the invention, even when a current used for driving the light source 1 is set to a constant value, the quantity of light to be released from the light source 1 is varied due to temperatures and the like; therefore, the quantity of light released from the light source 1 needs to be detected, and the light source 1 needs to be controlled based upon the detected signal. However, when the detected signal is varied due to factors other than the quantity of light released from the light source 1, the quantity of light released from the light source 1 is varied even when the quantity of light to be released from the light source is unchanged, causing serious problems. The background of the invention also describes that there is a possibility of the above-mentioned problems in the optical head in which the spherical aberration correcting device that corrects spherical aberration by forming diverging light and converging light is used.

These problems are caused because the length of light path from the spherical aberration correcting device to the objective-lens-use opening 16H differs from the length of light path from the spherical aberration correcting device to the light-source light-quantity controlling opening 17H, and because the size of the objective-lens-use opening 16H differs from the size of the opening of the light-source light-amount controlling opening 17H.

Therefore, in the present embodiment, the light-source light-quantity controlling opening 17H is placed at a position having the same length of light path from the spherical aberration correcting device to the objective-lens-use opening 16H, and the size of the light-source light-quantity controlling opening 17H is the same as the size of the objective-lens-use opening 16H. With this arrangement, even when the spherical aberration correcting device is driven, the signal to be detected by the light detector is only related to variations in the quantity of light to be released from the light source 1; thus, it becomes possible to detect a signal by which the light source 1 is controlled more appropriately.

Moreover, even in the case when, depending on the structure of the spherical aberration correcting device, even with a constant quantity of light released from the light source 1, the quantity of light to be released from the objective lens is varied due to variations in the distance of the lenses constituting the spherical aberration correcting device, the signal to be released from the light-quantity detection device is allowed to have the completely same variations; thus, by controlling the signal to be released from the light-quantity detection device to have a constant signal, it is possible to make the quantity of light released from the objective lens 9 constant, and consequently to provide an efficient structure.

As described above, with the arrangement in which: the light separation device is placed between the spherical aberration correcting device and the lens 14, the light-source light-quantity controlling opening 17H for aperture-controlling the light separated by the light separation device is placed at a position having the same length of light path from the spherical aberration correcting device to the objective-lens-use opening 16H, and the size of the opening thereof is made the same as the size of the objective-lens-use opening 16, it becomes possible to set the quantity of light to be released from the objective lens to a desired value, independent of environmental changes such as temperature changes, even in the case when the spherical aberration correcting device is driven; therefore, it is possible to prevent recorded information on the optical recording medium from being erroneously erased upon reproduction, and it is also possible to prevent a signal to be released from the objective lens from becoming too small to make the subsequent reproduced signal and control signal too small; thus, it becomes possible to prevent the subsequent failure in the reproducing operation and unstable controlling operations. It is also possible to prevent shortage of the quantity of light required for recording, and the subsequent failure in recording.

Here, in the present embodiment, the light-quantity detection device is constituted by the lens 14, the light-source light-quantity controlling light detector 15 and the light-source light-quantity controlling opening 17H; however, the lens 14 may be omitted without causing any problems.

EMBODIMENT 2

Next, referring to Figures, the following description will discuss embodiment 2 of the present invention. The present embodiment is different from the above-mentioned embodiment 1 only in that the position and the size of the opening of the light-source light-quantity controlling opening 17H are different from those of embodiment 1, and the other arrangements are the same as those of embodiment 1. Those parts in the present embodiment are same as those of embodiment 1, unless otherwise indicated, and those parts indicated by the same reference numerals as embodiment 1 have the same functions as those of embodiment 1, unless otherwise indicated.

Figure 2:
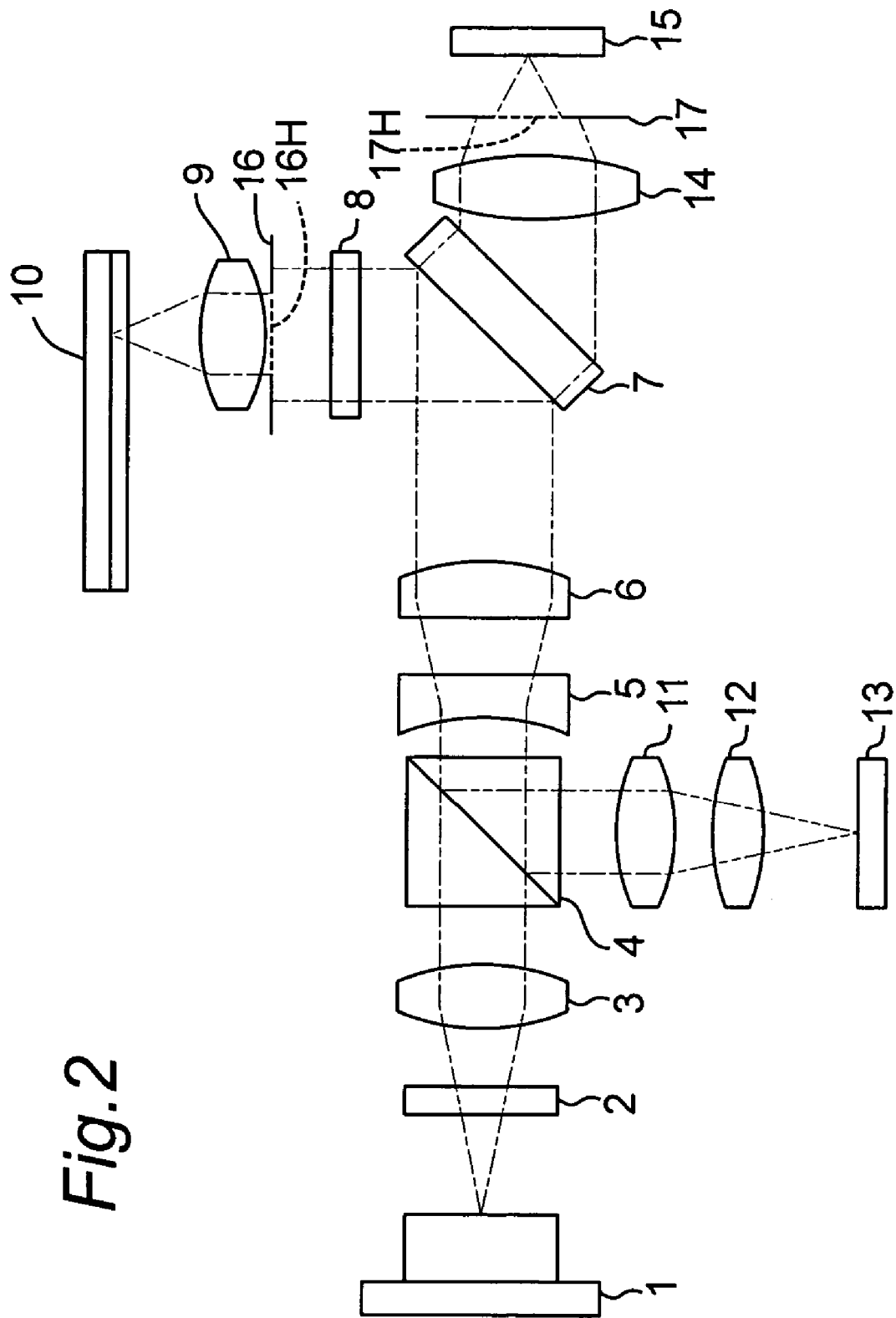
FIG. 2 is a schematic drawing that shows another optical head in accordance with a second embodiment of the present invention.

FIG. 2 is a block diagram showing an optical head in accordance with embodiment 2 of the present invention. In this case, the lens 14 is placed at a position having a length of light path from the spherical aberration correcting device that is shorter than the length of light path from the spherical aberration correcting device to the objective-lens-use opening 16H. Moreover, the light-source light-quantity controlling opening 17H is placed between the lens 14 and the light-source light-quantity controlling light detector 15. Here, since the operations of the optical head are the same as those described in embodiment 1, the description thereof is omitted in this embodiment.

Figure 3:
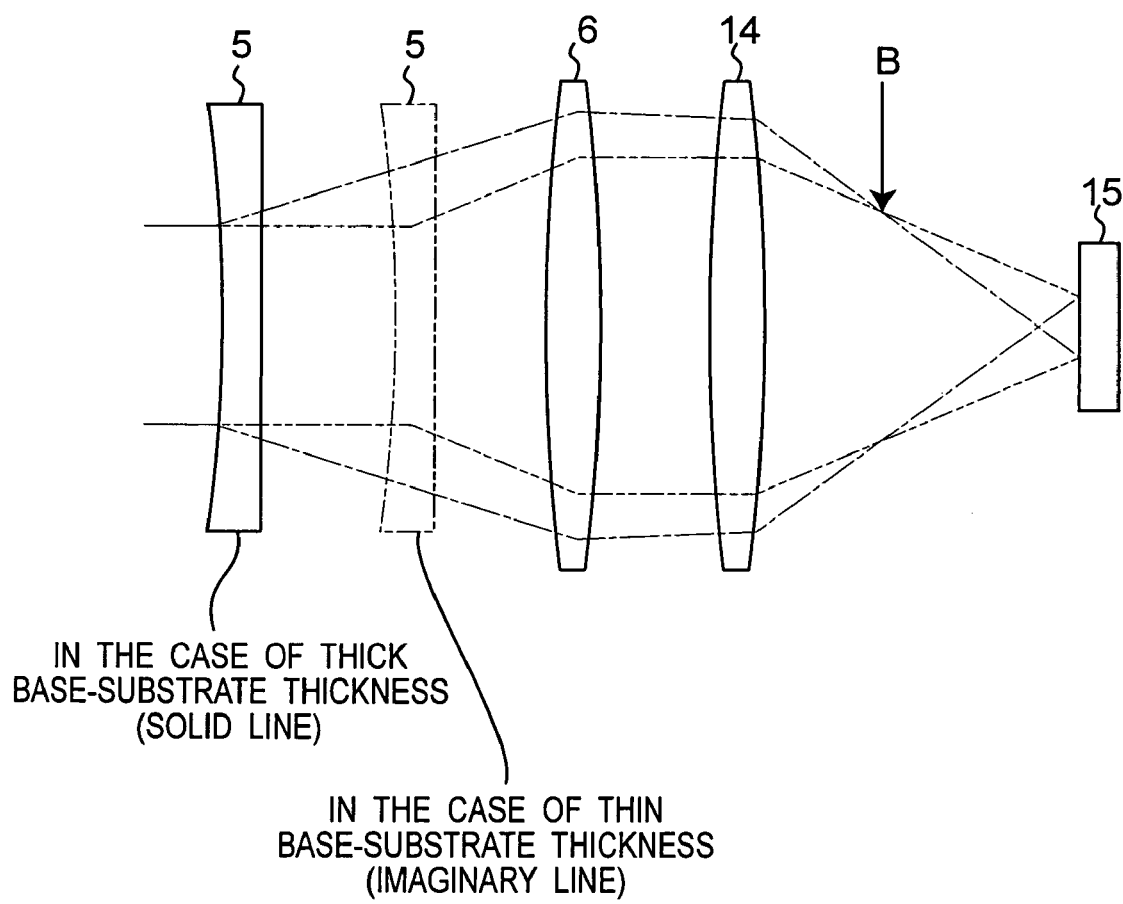
FIG. 3 is a drawing that shows a light path of light upon driving a spherical aberration correcting device.

Here, referring to FIG. 3, the following description will discuss the reason why the quantity of light becomes constant when an opening is formed in converging light rays. FIG. 3 shows which light paths light rays that have been made incident on the spherical aberration correcting device are allowed to pass through to be further made incident on the light-source light-quantity controlling light detector 15; and a solid line shows a light path obtained when spherical aberration that occurs in the case of a thick (thicker than a standard value) base-substrate thickness of the optical recording medium is corrected by the spherical aberration correcting device, and a imaginary line shows a light path obtained when spherical aberration that occurs in the case of a thin (thinner than the standard value) base-substrate thickness of the optical recording medium is corrected by the spherical aberration correcting device. As indicated by FIG. 3, when the light-source light-quantity controlling opening 17H is placed between the lens 14 and the spherical aberration correcting device, the quantity of light that is made incident on the light-source light-quantity controlling light detector 15 is varied in response to the distance between the concave lens 5 and the convex lens 6. In this case, however, when the light-source light-quantity controlling opening 17H is placed at a position (B) at which the solid line intersects the imaginary line in the converging light between the lens 14 and the light-source light-quantity controlling light detector 15, it is possible to allow the same quantity of light to be made incident on the light-source light-quantity controlling light detector 15, whichever spherical aberration is corrected. In other words, placing the light-source light-quantity controlling opening 17H in the converging light is the same as placing it at a position that has the equivalent length of light path from the spherical aberration correcting device to the objective-lens-use opening 16H.

With this arrangement, in the same manner as described in embodiment 1, even when the spherical aberration correcting device is driven, the signal to be detected by the light detector is only related to variations in the quantity of light to be released from the light source 1; thus, it becomes possible to detect a signal by which the light source 1 is controlled more appropriately. Moreover, in the present embodiment, even in the case when, depending on the structure of the spherical aberration correcting device, even with a constant quantity of light released from the light source 1, the quantity of light released from the objective lens is varied due to variations in the distance of the lenses constituting the spherical aberration correcting device, the signal to be released from the light-quantity detection device is allowed to have completely the same variations; thus, by controlling the signal to be released from the light-quantity detection device to have a constant signal, it is possible to make the quantity of light released from the objective lens constant, and consequently to provide an efficient structure. Moreover, since the light-source light-quantity controlling opening 17H is placed in the converging light in the present embodiment, it is possible to shorten the distance from the spherical aberration correcting device to the light-source light-quantity controlling opening 17H, and consequently to effectively miniaturize the optical head.

As described above, with the arrangement in which the light-source light-quantity controlling opening 17H is placed in the converging light in the light-quantity detection device, it becomes possible to set the quantity of light to be released from the objective lens to a desired value, independent of environmental changes such as temperature changes, even while the spherical aberration correcting device is driven; therefore, it is possible to prevent recorded information from being erroneously erased upon reproduction, and it is also possible to prevent a signal to be released from the objective lens from becoming too small to make the subsequent reproduced signal and control signal too small; thus, it becomes possible to prevent the subsequent failure in the reproducing operation and unstable controlling operations. It is also possible to prevent shortage of the quantity of light required for recording, and the subsequent failure in recording. Moreover, since the distance from the spherical aberration correcting device to the light-source light-quantity controlling opening 17H is shortened, it is possible to effectively miniaturize the optical head.

Here, in embodiments 1 and 2, the member 17 having the light-source light-quantity controlling opening 17 is compatibly formed by a member that holds the lens 14; however, another member may be used without causing any problems.

EMBODIMENT 3

Next, referring to Figures, the following description will discuss embodiment 3 of the present invention. The present embodiment is different from the above-mentioned embodiments 1 and 2 only in that a light separation device that separates light to be made incident on the light quantity detection device constituted by the lens 14 and the light-source light-quantity controlling light detector 15 is placed between the light source and the spherical aberration correcting device so that characteristics of the polarized beam splitter and the mirror are different from those of the above-mentioned embodiments; and the other arrangements are the same as those of embodiment 1. Therefore, those parts in the present embodiment are same as those of embodiment 1, unless otherwise indicated, and those parts indicated by the same reference numerals as the embodiment 1 have the same functions as those of embodiment 1, unless otherwise indicated.

Figure 4:
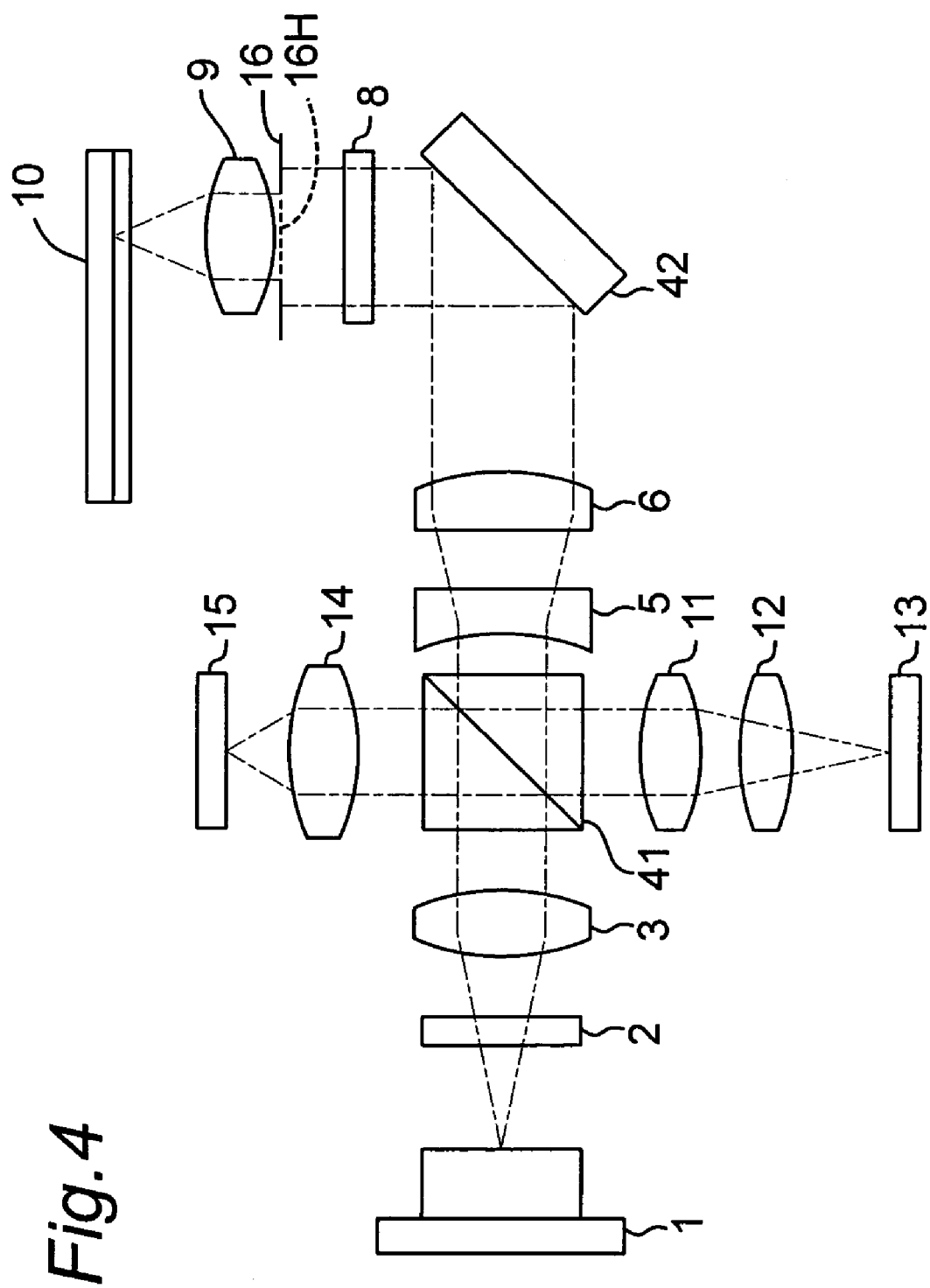
FIG. 4 is a schematic drawing that shows still another optical head in accordance with a third embodiment of the present invention.

FIG. 4 is a block diagram showing an optical head in accordance with embodiment 3 of the present invention. Here, reference numeral 41 is a polarized beam splitter, and reference numeral 42 is a mirror. With respect to linearly polarized light having a certain polarizing direction, the polarized beam splitter 41 transmits 95% thereof, while reflecting 5% thereof, and with respect to linearly polarized light orthogonal to the above-mentioned linearly polarized light, reflects 100% thereof, and the mirror 42 reflects 100% thereof irrespective of directions of polarized lights. Moreover, the light quantity detection device, constituted by the lens 14 and the light-source light-quantity controlling light detector 15, is designed to use reflected light derived from the forward path of the polarized beam splitter 41. Here, the light separation device is formed by the polarized beam splitter 41.

The following description will discuss operations of the optical head having the above-mentioned arrangement. Linearly polarized light, released from the light source 1, is divided into three beams by the diffraction grating 2, and the three divided light beams are converted to parallel light rays by the collimator lens 3. With respect to the light converted into the parallel light rays, only one portion thereof is reflected from the polarized beam splitter 41, with most of it being allowed to transmit. The transmitted light is made incident on the spherical aberration correcting device. In this case, in order to correct spherical aberration that occurs when the base-substrate thickness deviates from a standard base-substrate thickness, the incident parallel light rays are converted to diverging light and converging light by changing the distance between the concave lens 5 and the convex lens 6 that constitute the spherical aberration correcting device; thus, the converted light is made incident on the mirror 42 and all the light is reflected, and changed in its advancing direction to the optical recording medium 10.

This reflected light is made incident on the ¼ wavelength plate 8 to be converted from linearly polarized light to circularly polarized light; thus, this circularly polarized light is aperture-controlled by the objective-lens-use opening 16H, and made incident on the objective lens 9 so that spherical aberration is generated in proportion to a degree of divergence or a degree of convergence of the incident light, and is further converged on the optical recording medium 10. Here, since light having wave aberration capable of correcting the wave aberration occurring upon deviation in the base-substrate thickness of the optical recording medium 10 from the standard value is converged thereon by the objective lens 9, a light spot that is free from aberration, that is, a light spot that is limited to the diffraction limit, is formed on the optical recording medium 10.

Next, the circularly polarized light, reflected from the optical recording medium 10, is inputted to the ¼ wavelength plate 8, and converted to linearly polarized light in a direction orthogonal to the linearly polarized light released from the light source 1. The linearly polarized light converted by the ¼ wavelength plate 8 is all reflected by the mirror 7, allowed to pass through the spherical aberration correcting device, and reflected by the polarized beam splitter 41 and further converged by the condenser lens 11 without returning to the light source 1 so that astigmatism is given to the light by the cylindrical lens 12, and the resulting light is converged on the light detector 13. The light detector 13 outputs a focus error signal that indicates the focused state of light on the optical recording medium 10, and also outputs a tracking error signal that indicates the irradiation position of light.

Here, the focus error signal and the tracking error signal are detected by known techniques such as an astigmatism method and a three beam method. Based upon the focus error signal, a focus control device, not shown, controls the position of the objective lens 9 in the light axis direction so that the light is always converged on the optical recording medium 10 in the focused state. Moreover, based upon the tracking error signal, a tracking control device, not shown, controls the position of the objective lens 9 so that light is converged on a desired track on the optical recording medium 10. Furthermore, information recorded on the optical recording medium 10 is also obtained by the light detector 13. Moreover, a portion of the light in the forward path, reflected by the polarized beam splitter 41, is converged on the light-source light-quantity controlling light detector 15 by the lens 14, and the light-source light-quantity controlling light detector 15 outputs an electric signal corresponding to the quantity of light released from the light source 1.

As described in the present embodiment, when the light separation device, which makes light incident on the light quantity detection device (constituted by the lens 14 and the light-source light-quantity controlling light detector 15), is placed between the spherical aberration correcting device (provided with the concave lens 5 and the convex lens 6) and the light source, the light to be used in the light quantity detection device is not varied even when the spherical aberration correcting device is driven; therefore, it is possible to positively detect the signal corresponding to the quantity of light released from the light source 1, and by controlling the light source 1 using the signal, it is possible to make the quantity of light released from the objective lens constant.

As described above, with the arrangement in which the light quantity detection device is placed between the spherical aberration correcting device and the light source, it becomes possible to set the quantity of light to be released from the objective lens to a desired value, independent of environmental changes such as temperature changes, even while the spherical aberration correcting device is driven; therefore, it is possible to prevent recorded information from being erroneously erased upon reproduction, and it is also possible to prevent a signal to be released from the objective lens from becoming too small to make the subsequent reproduced signal and control signal too small; thus, it becomes possible to prevent the subsequent failure in the reproducing operation and unstable controlling operations. It is also possible to prevent shortage of the quantity of light required for recording, and the subsequent failure in recording.

Here, in the present embodiment, the light amount detection device is constituted by the lens 14 and the light-source light-quantity controlling light detector 15; however, the lens 14 may be omitted without causing any problems.

Figure 5:
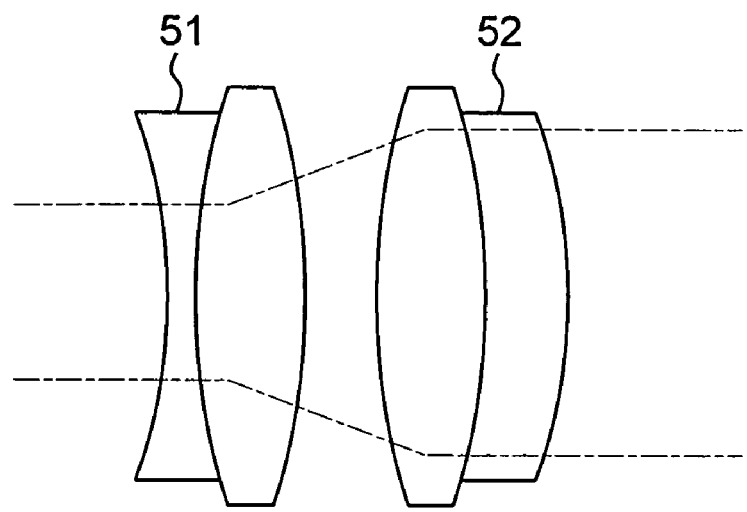
FIG. 5 is a schematic drawing that shows another example of the spherical aberration correcting device.

Moreover, embodiments 1 and 2 use a system in which a concave lens and a convex lens are used as the spherical aberration correcting device; however, these may be replaced by a group of positive lenses and a group of negative lenses. FIG. 5 is a schematic drawing that shows a spherical aberration correcting device (in which a uniaxial actuator is not shown) provided with a group of negative lenses 51 having a negative power and a group of positive lenses 52 having a positive power. Since the respective groups of the lenses are formed by glass materials having mutually different Abbe numbers, it is possible to provide a spherical aberration correcting device capable of correcting color aberration generated by the lenses forming the optical head, that is, in particular, objective lenses. Moreover, in the system using lenses, it becomes possible to correct spherical aberration in both of the forward path and return path, and consequently to provide a stable reproduced signal and control signal.

Figure 6:
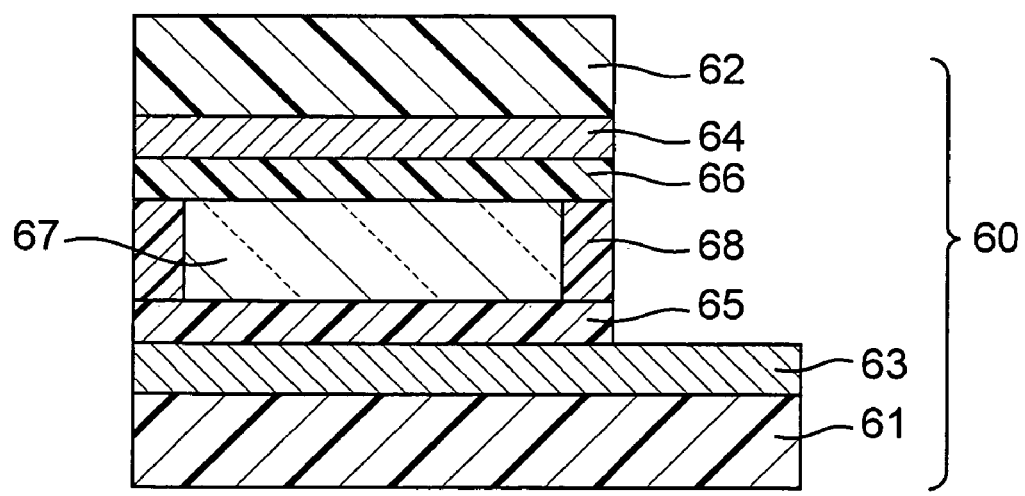
FIG. 6 is a cross-sectional view that shows one example of the spherical aberration correcting device having a phase change layer.
Figure 7:
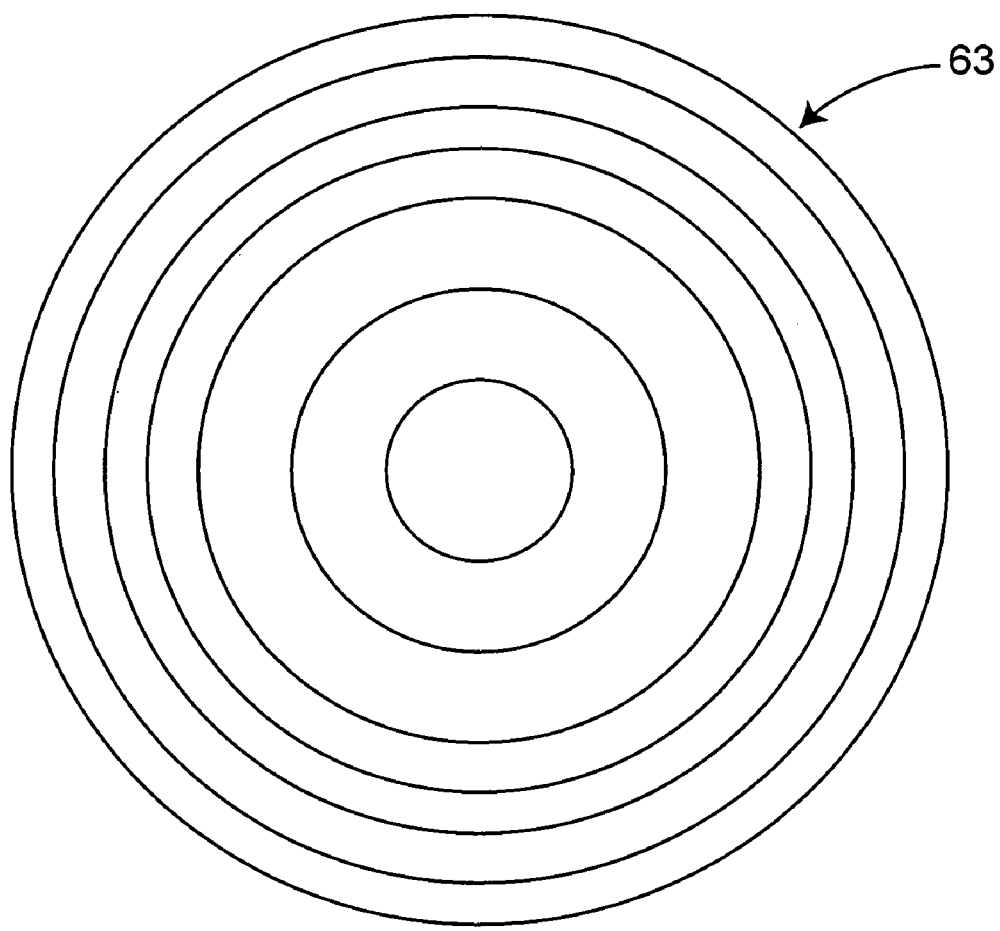
FIG. 7 is a drawing that shows one example of an electrode pattern of the spherical aberration correcting device having the phase change layer.

Moreover, another system using no lenses in the spherical aberration correcting device may be adopted. For example, a system using a phase change layer, disclosed in Japanese Patent Laid-open Publication No. 2002-109776 (Japanese Patent Application No. 2001-221927), may be used. The following description briefly discusses an optical element used in this system. FIG. 6 is a cross-sectional view that shows an optical element using liquid crystal, which serves as a phase change layer, and FIG. 7 shows a pattern used in the optical element. In FIG. 6, reference numeral 61 is a first substrate, reference numeral 62 is a second substrate that is placed virtually in parallel with the first substrate 61, reference numeral 63 is a voltage-applying electrode placed between the first substrate 61 and liquid crystal 67, reference numeral 64 is an opposing electrode that is placed virtually in parallel with the voltage-applying electrode so as to face the voltage-applying electrode 63, reference numeral 65 is a translucent resin film that is formed so as to cover the voltage-applying electrode 63, reference numeral 66 is a translucent resin film formed so as to cover the opposing electrode 64, reference numeral 67 is liquid crystal that is placed between the translucent resin films 65 and 66 (between the voltage-applying electrode 63 and the opposing electrode 64) and reference numeral 68 is a sealing resin that is placed between the translucent resin films 65 and 66 in a manner so as to enclose the liquid crystal 67.

Here, the first substrate 61 and the second substrate 62 are made from, for example, glass, and have a translucent property. Moreover, the voltage-applying electrode 63 is an electrode that is used for applying a desired voltage to the liquid crystal 67. The voltage-applying electrode 63 is formed on a main surface inside (on the liquid crystal 67 side) the first substrate 61. Further, the opposing electrode 64 serves as an electrode that is used for applying a desired voltage to the liquid crystal 67, together with the voltage-applying electrode 63. The opposing electrode 64 is formed on a main surface inside (on the liquid crystal 67 side) the second substrate 62. The opposing electrode 64 has a translucent property, and is made from, for example, ITO. Here, the opposing electrode 64 is virtually uniformly formed at least on a portion of the main surface inside the second substrate 62 that faces the segment electrode.

Moreover, the translucent resin films 65 and 66, which are alignment films used for aligning the liquid crystal 67 in a predetermined direction, are made of, for example, polyvinyl alcohol films. The translucent resin film 65 or 66 is subjected to a rubbing treatment so that the liquid crystal 67 is aligned in a predetermined direction. Moreover, the liquid crystal 67 functions as a phase change layer that changes the phase of incident light. The liquid crystal 67 is made from, for example, nematic liquid crystal. By changing the voltage difference between the voltage-applying electrode 63 and the opposing electrode 64, it is possible to change the refractive index of the liquid crystal 67, and consequently to change the phase of incident light. Moreover, the sealing resin 68, which is used for sealing the liquid crystal 67, is made from, for example, epoxy resin. As shown in FIG. 7, the voltage-applying electrode 63 is constituted by segment electrodes in the form of concentric circles. These segment electrodes are translucent, and made from, for example, ITO.

The following description will discuss operations of the optical element having the above-mentioned arrangement. Control voltages are externally applied to the respective segment electrodes of the voltage-applying electrode of the optical element so as to apply phases of power components to incident light onto the optical element of the present invention. This arrangement makes it possible to convert incident plane waves to spherical waves, and the resulting spherical waves are made incident on the objective lens to generate spherical aberration so that this spherical aberration is used for correcting spherical aberration that occurs when the thickness of the optical recording medium deviates from the designed (standard) base-substrate thickness. Here, the liquid crystal, which has a change in the refractive index in response to voltage, is used as the phase change layer; however, PLZT (transparent crystal substance of the perovskites structure including tin oxide, lanthanum, zirconia or titania), which has a change in thickness (volume) in response to voltage, may be used.

Here, since PLZT is a solid, different from the liquid crystal, neither substrate nor sealing resin is required so that it is possible to make the optical element thinner. In the case of the methods described in embodiments 1 and 2, since the lens is used, it is possible to correct aberration derived from the base-substrate thickness of the optical recording medium, of course, in the forward path, as well as in the return path, and consequently to provide a stable control signal. Moreover, in the above-mentioned system, since aberration derived from the base-substrate thickness of the optical recording medium is corrected by using the optical element using the phase change layer, this system is suitable for miniaturization of the optical head. Since any of the lens system and the above-mentioned system using the phase change layer can correct the spherical aberration by using converging light and diverging light, there is no degradation in the spherical aberration correcting function even when the objective lens is shifted.

In the above-described embodiment, the spherical aberration correcting device is constituted by a concave lens, a convex lens and a lens position changing mechanism (not shown in the drawings) for changing the distance between the both lenses, however the spherical aberration correcting device may be constituted, without using such a concave lens and a convex lens, by arranging to change the position of the collimator lens.

Also, in the above-mentioned embodiments, a single lens is used; however, set lenses, which have a higher NA, may also be used without causing any problems.

Further, in the above-mentioned embodiments, an optical head of an infinite type is used; however, an optical head of a finite type without using a collimator lens may be adopted.

Moreover, in the above-mentioned embodiments, an optical head of a polarization optical system is used; however, an optical head of a non-polarization optical system may be used.

The above-mentioned embodiments have not discussed the method for detecting deviations in the base-substrate thickness from the standard base-substrate thickness of the optical recording medium; however, these can be detected by using a preliminarily determined learning method before a recording or reproducing operation of the optical recording medium. Moreover, another method has been disclosed in Japanese Patent Laid-open Publication No. 2000-171346. In this method, spherical aberration is detected based upon two focal positions derived from a first light beam on the side closer to the light axis of light reflected from the optical recording medium and a second light beam located outside the first light beam. Furthermore, still another method has been disclosed in Japanese Patent Laid-open Publication No. 10-334575. Specifically, in this method, a light source, a first optical system that applies light released from the light source to an optical recording medium (an object to be measured) and a second optical system that directs light reflected from the optical recording medium to a light-receiving element. Here, the light source is formed by a laser, an LED or a lamp, and each of the first and second optical systems is constituted by convex lenses or a combination of convex lenses and concave lenses. With this arrangement, a different signal is released from the light-receiving element depending on the base-substrate thickness so that the signal corresponding to the base-substrate thickness is obtained.

Moreover, when the NA of the objective lens exceeds 0.7, the quantity of generated aberration corresponding to the base-substrate deviation from the optimum base-substrate thickness of the optical recording medium becomes greater with the result that the aberration margin for recording is narrowed; thus, a spherical aberration correcting device is required and the present invention is effectively applied.

Figure 12:
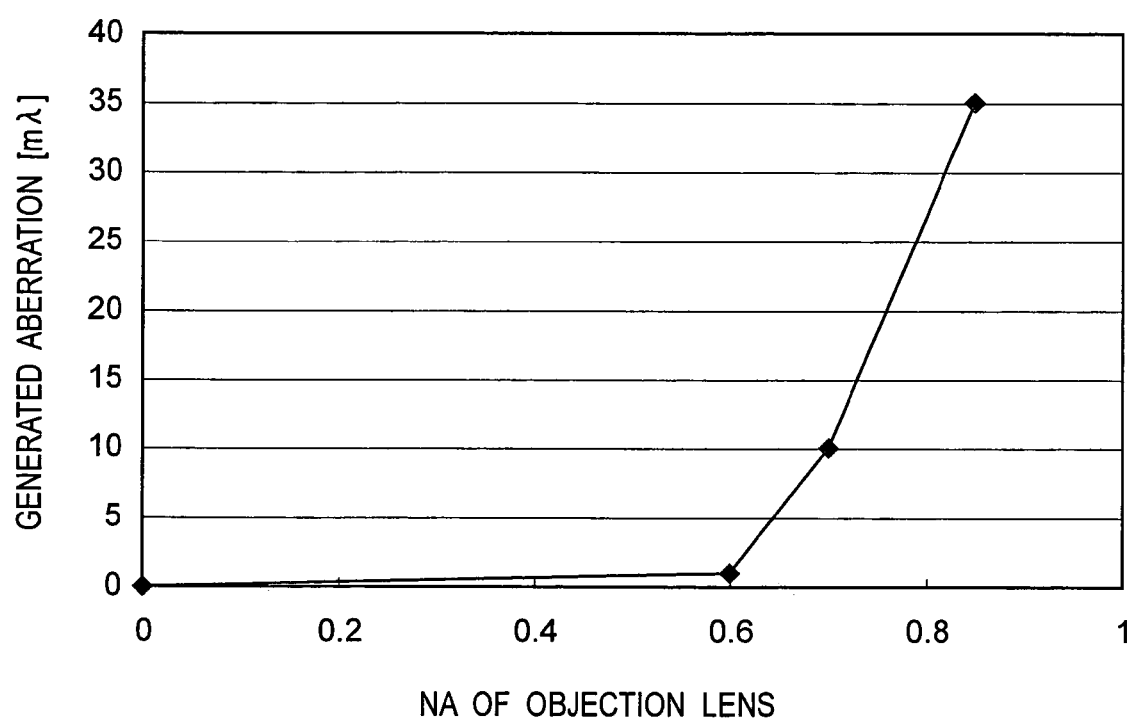
FIG. 12 is a graph showing a relationship between NA of the objective lens and amount of aberration.

Furthermore, the present invention is more advantageous when the NA of the objective lens 9 is 0.6 or more. This fact will be explained in detail. Actually, the allowance for aberration in manufacturing lens 9 becomes strict according to the NA of the objective lens 9. In forming the objective lens 9, at least 5 μm of decenter between a first surface and a second surface of the objective lens 9 is generated. FIG. 12 is a graph showing a relationship between the NA of the objective lens 9 and amount of generated coma aberration when 5 μm of decenter between a first surface and a second surface of the objective lens 9 is generated. As is well known from FIG. 12, when the NA becomes greater than 0.6, a coma aberration by the decenter is generated. Furthermore, in considering the other tolerance, in the case of the objective lens 9 having the NA greater than 0.6, considerable aberration is generated by the tolerance in manufacturing.

Accordingly, in the case of the objective lens 9 having the NA greater than 0.6, the amount of generated aberration due to the deviation in the base-substrate thickness of the optical recording medium becomes significant. Therefore, the present invention is more advantageous when the NA of the objective lens 9 is 0.6 or more.

In the same manner, when the wavelength becomes very short, such as a level of not more than 450 nm, the quantity of generated aberration corresponding to the base-substrate deviation becomes greater with the result that the aberration margin for recording is narrowed; thus, a spherical aberration correcting device is required and the present invention is effectively applied.

In the above-described embodiments, the member 16 having the objective-lens-opening 16H and the member 17 having the light-source light-quantity controlling opening 17H are constituted by members for holding lens respectively. However, they may be provided directly on the basic pedestal of the optical head. In this case, since the number of parts can be reduced, it is possible to reduce the manufacturing cost and miniaturize the optical head.

Further, in the above-described embodiments, the light passed through the mirror 7 is made incident on the light-source light-quantity controlling light detector 15 by means of the lens 14. However, the light passed through the mirror 7 may be made incident directly on the light-source light-quantity controlling light detector 15, by omitting the lens 14, without any problems.

EMBODIMENT 4

Embodiment 4 discusses one example of an optical recording/reproducing apparatus in accordance with the present invention. The optical recording/reproducing apparatus of embodiment 4 is an apparatus that carries out recording and reproducing operations of a signal on and from an optical recording medium.

Figure 8:
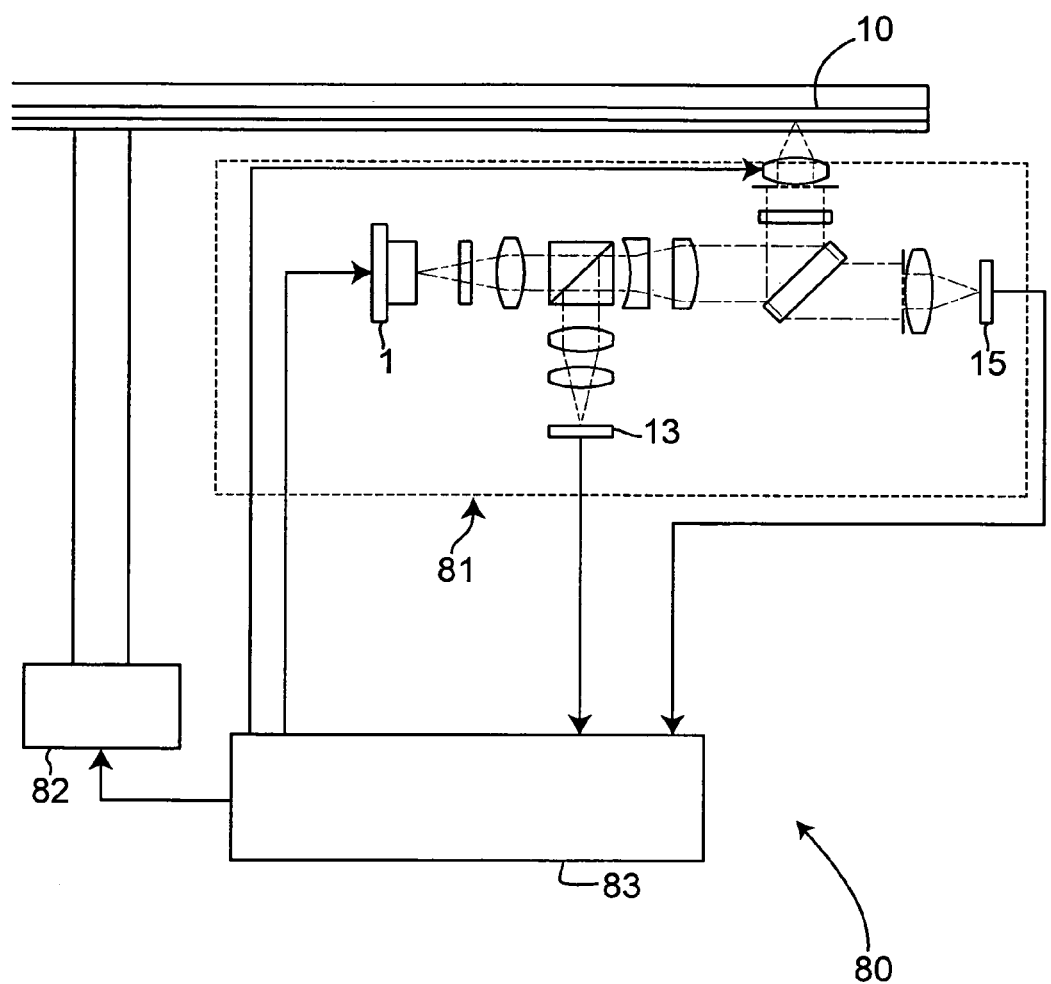
FIG. 8 is a schematic drawing that shows an optical recording/reproducing apparatus in accordance with a fourth embodiment of the present invention.
Figure 9:
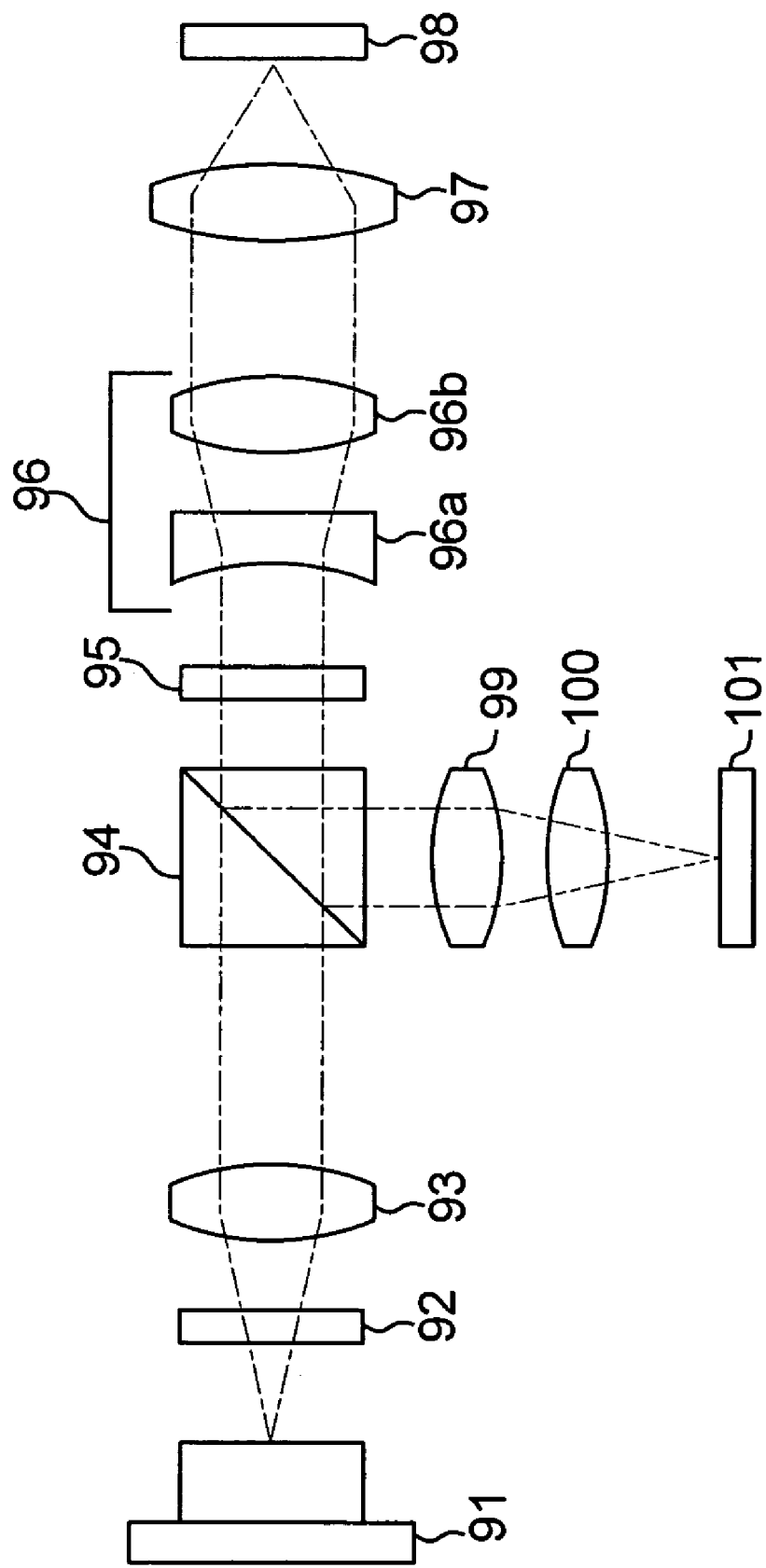
FIG. 9 is a schematic drawing that shows one example of a conventional optical head.
Figure 10:
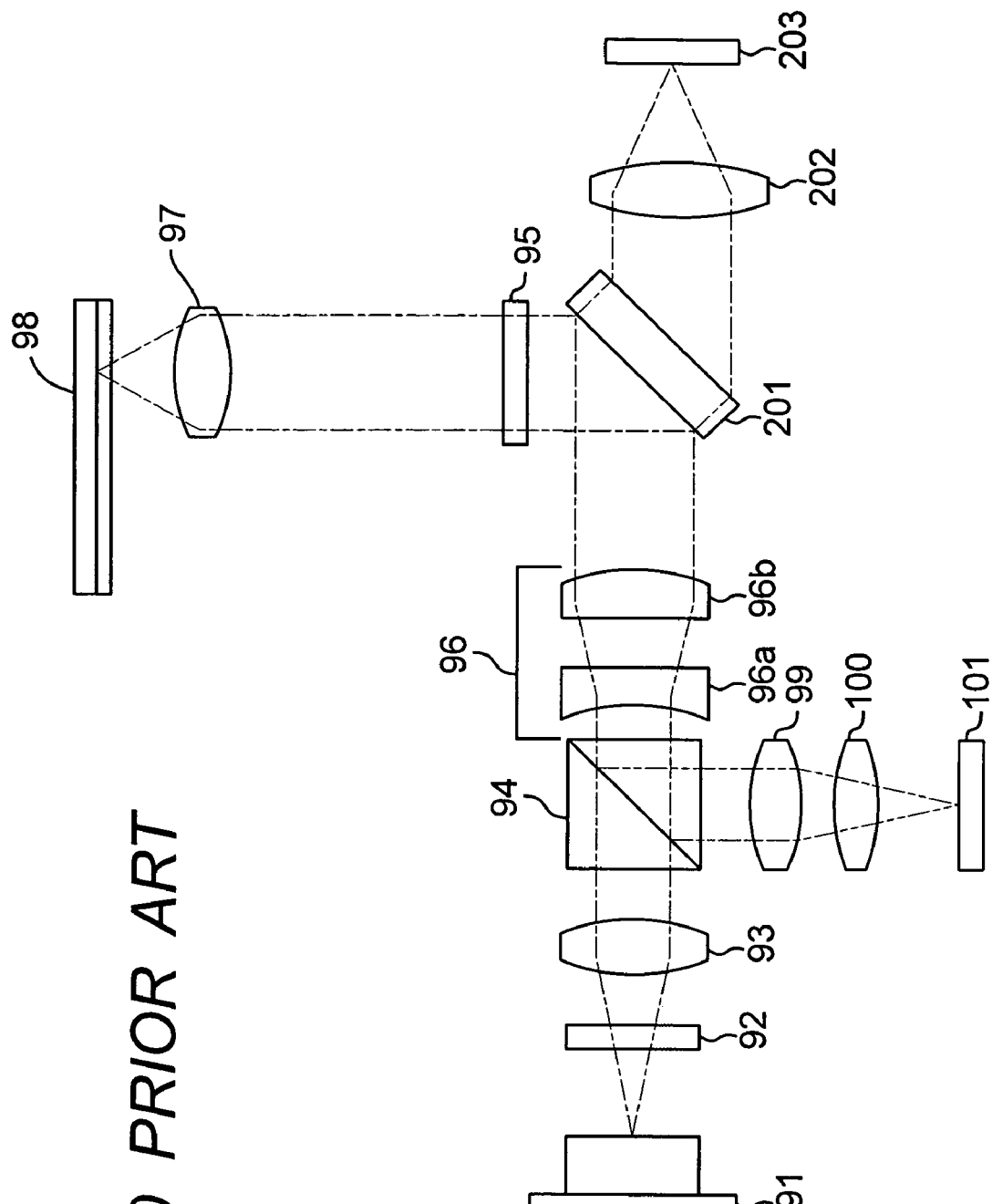
FIG. 10 is a schematic drawing that shows another example of a conventional optical head.
Figure 11:
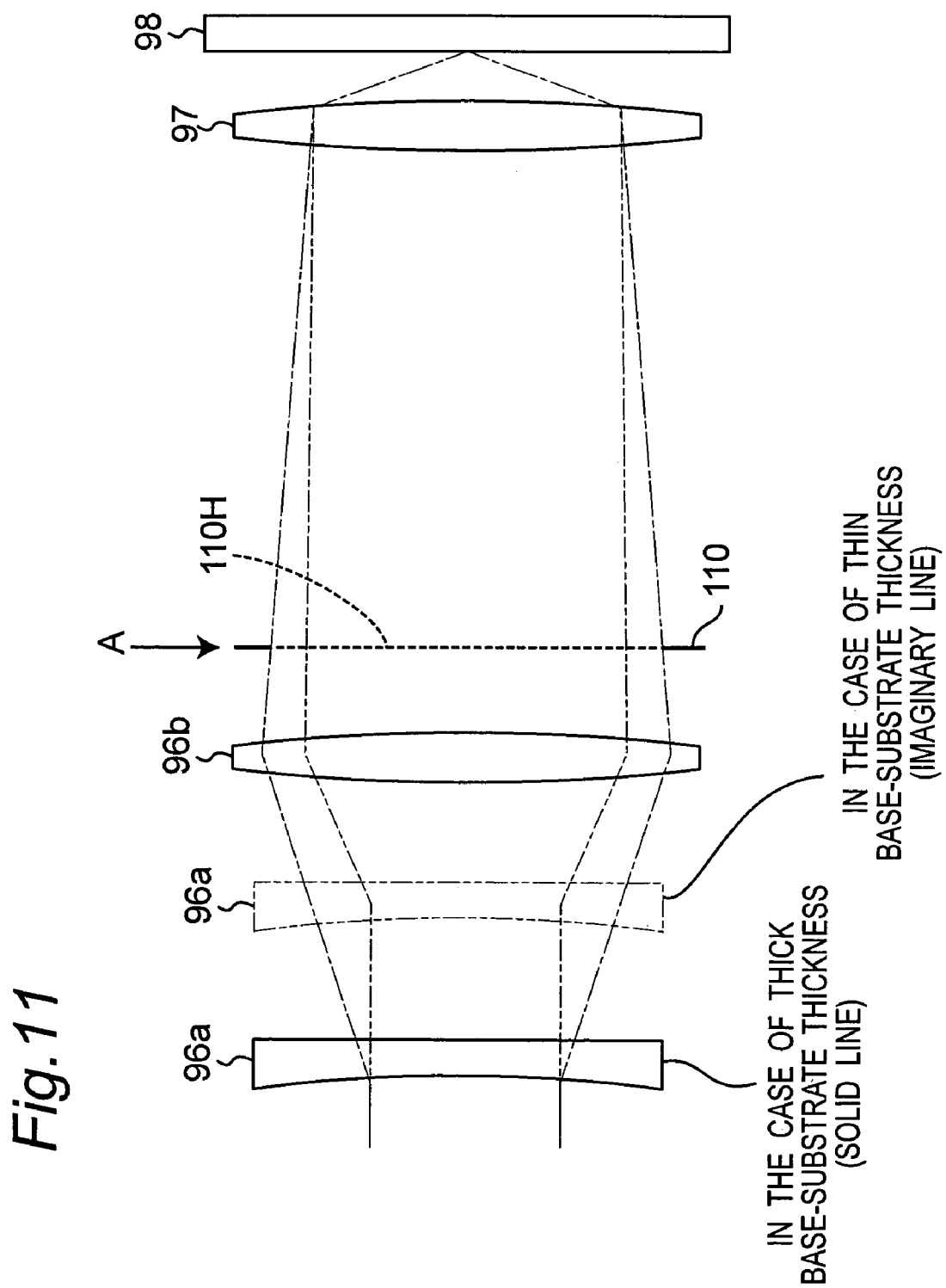
FIG. 11 is a drawing that shows a light path of light up to an objective lens when a spherical aberration correcting device in a optical head is driven.

FIG. 8 schematically shows a structure of an optical recording/reproducing apparatus 80 of embodiment 4. The optical recording/reproducing apparatus 80 is provided with an optical head 81, a motor 82 and a processing circuit 83. The optical head 81 has been described in embodiment 1.

Since the optical head 81 has the same structure as that explained in embodiment 1, the overlapping description thereof is omitted.

The following description discusses operations of the optical recording/reproducing apparatus 80. First, when an optical recording medium 10 is set on the optical recording/reproducing apparatus 80, the processing circuit 83 outputs a signal so as to rotate the motor 82 so that the motor 82 is allowed to rotate. Next, the processing circuit 83 drives the light source 1 to release light. The light released from the light source 1 is reflected by the optical recording medium 10, and the reflected light is made incident on the light detector 13. The light detector 13 outputs a focus error signal that indicates the focused state of the light on the optical recording medium 10 and a tracking error signal that indicates an irradiation position of light to the processing circuit 83. Based upon these signals, the processing circuit 83 outputs a signal for controlling the objective lens 9 so that the light, released from the light source 1, is converged on a desired track on the optical recording medium 10. Moreover, based upon a signal outputted from the light detector 13, the processing circuit 83 reproduces information recorded on the optical recording medium 10. Moreover, the signal, outputted from the light-source light-quantity controlling light detector 15, is inputted to the processing circuit 83; thus, the processing circuit 83 controls the light source 1 to set the signal to a desired value so that the quantity of light released from the objective lens 9 is set to a desired value.

As described above, since this apparatus uses the optical head of embodiment 1 as its optical head, the objective lens is allowed to output a desired quantity of light even when the spherical aberration correcting device is driven; thus, it becomes possible to obtain a stable control signal and reproduced signal, and consequently to carry out a stable recording operation.

The embodiments of the invention being thus described by device of examples, it will be obvious that not limited to the above-mentioned embodiments, the same may be applied to other embodiments based upon the technical idea of the present invention.

Moreover, the above-mentioned embodiments have discussed the optical recording medium for recording information by using only light; however, the present invention may of course be applied to optical recording media for recording information by using light and magnetism, with the same effects.

Furthermore, the above-mentioned embodiments have discussed the case in which the optical recording medium is an optical disk; however, the present invention may be applied to optical information recording/reproducing apparatuses that have similar functions, such as card-shaped optical recording media.

As described above, in accordance with the present invention, in the case when the light quantity detection device is placed between the spherical aberration correcting device and the light source or when the light quantity detection device is placed between the spherical aberration correcting device and the optical recording medium, by setting the position of the light-source light-quantity controlling opening that forms the light quantity detection device at a position corresponding to an optical light path length from the spherical aberration correcting device to the objective-lens-use opening or at a desired position in the converging light of the light quantity detection device, the signal to be outputted from the light quantity detection device is allowed to correspond to only the quantity of light outputted from the light source even when the spherical aberration correcting device is driven; thus; when the light source 1 is controlled by using the above-mentioned signal, it becomes possible to set the quantity of light to be outputted from the objective lens to a desired value, and consequently to provide stable reproducing and recording operations.

Moreover, by using the above-mentioned optical head, it is possible to obtain a stable control signal and reproduced signal even when the spherical aberration correcting device is driven, and consequently to achieve an optical recording/reproducing apparatus capable of carrying out a stable recording operation.

The present disclosure relates to subject matter contained in Japanese Application No. 2003-102609, filed on Apr. 7, 2003, the contents of which are herein expressly incorporated by reference in its entirety.

What is claimed is:

1. An optical head which performs recording and/or reproducing of a signal to an optical recording medium, comprising:
   a light source;
   an objective lens that converges light released from the light source onto the optical recording medium;
   an objective-lens-use opening that determines an aperture of the objective lens;
   a spherical aberration correcting device that corrects spherical aberration that occurs when the optical recording medium has a base-substrate thickness that deviates from a standard base-substrate thickness;
   a light separation device that is placed in a light path from the spherical aberration correcting device to the optical recording medium;
   a light-source light-quantity controlling opening that aperture-controls light that has been separated by the light separation device;
   a first light detector that receives light that has been aperture-controlled by the light-source light-quantity controlling opening; and
   a second light detector that receives light that has been reflected by the optical recording medium;
   wherein: a length of an optical light path from the spherical aberration correcting device to the objective-lens-use opening is made substantially the same as a length of an optical light path from the spherical aberration correcting device to the light-source light-quantity controlling opening, and the aperture of the light-source light-quantity controlling opening substantially has the same size as the aperture of the objective-lens-use opening.

2. The optical head according to claim 1, wherein the spherical aberration correcting device corrects the spherical aberration by generating at least one of a converging light and a diverging light.

3. The optical head according to claim 2, wherein the spherical aberration correcting device is constituted by a group of positive lenses and a group of negative lenses.

4. The optical head according to claim 1, wherein the spherical aberration correcting device is an optical element comprising a phase change layer placed between a pair of substrates having transparent conductive thin films.

5. The optical head according to claim 4, wherein light that is made incident on the phase change layer is converted to diverging light or converging light by the phase change layer.

6. The optical head according to claim 1, wherein the optical head further comprises a base-substrate thickness detection device that detects a base substrate thickness of the optical recording medium.

7. The optical head according to claim 6, wherein the base-substrate thickness detection device comprises:
   a light source;
   a lens that converges light released from the light source on the optical recording medium; and
   a light detector that detects light that has been reflected by the optical recording medium.

8. The optical head according to claim 6, wherein the base-substrate thickness detection device detects information relating to the base-substrate thickness based upon two focal points of a first light ray on the side closer to a light axis of light and a second light ray on the outside of the first light ray.

9. The optical head according to claim 1, wherein the objective lens has an NA of not less than 0.6.

10. The optical head according to claim 1, wherein the light source has a wavelength of not more than 450 nm.

11. An optical head which performs recording and/or reproducing of a signal to an optical recording medium, comprising:
   a light source;
   an objective lens that converges light released from the light source onto the optical recording medium;
   a spherical aberration correcting device that corrects spherical aberration that occurs when the optical recording medium has a base-substrate thickness that deviates from a standard base-substrate thickness;
   a light separation device that is placed in a light path from the spherical aberration correcting device to the optical recording medium;
   a lens that converges light that has been separated by the light separation device;
   a light-source light-quantity controlling opening that aperture-controls light that has been converged by the lens;
   a first light detector that receives light that has been aperture-controlled by the light-source light-quantity controlling opening; and
   a second light detector that receives light that has been reflected by the optical recording medium.

12. The optical head according to claim 11, wherein the spherical aberration correcting device corrects the spherical aberration by generating at least one of a converging light and a diverging light.

13. The optical head according to claim 12, wherein the spherical aberration correcting device is constituted by a group of positive lenses and a group of negative lenses.

14. The optical head according to claim 11, wherein the spherical aberration correcting device is an optical element comprising a phase change layer placed between a pair of substrates having transparent conductive thin films.

15. The optical head according to claim 14, wherein light that is made incident on the phase change layer is converted to diverging light or converging light by the phase change layer.

16. The optical head according to claim 11, wherein the optical head further comprises a base-substrate thickness detection device that detects a base substrate thickness of the optical recording medium.

17. The optical head according to claim 16, wherein the base-substrate thickness detection device comprises:
   a light source;
   a lens that converges light released from the light source on the optical recording medium; and
   a light detector that detects light that has been reflected by the optical recording medium.

18. The optical head according to claim 16, wherein the base-substrate thickness detection device detects information relating to the base-substrate thickness based upon two focal points of a first light ray on the side closer to a light axis of light and a second light ray on the outside of the first light ray.

19. The optical head according to claim 11, wherein the objective lens has an NA of not less than 0.6.

20. The optical head according to claim 11, wherein the light source has a wavelength of not more than 450 nm.

21. An optical head which performs recording and/or reproducing of a signal to an optical recording medium, comprising:
   a light source;
   an objective lens that converges light released from the light source onto the optical recording medium;
   a spherical aberration correcting device that corrects spherical aberration that occurs when the optical recording medium has a base-substrate thickness that deviates from a standard base-substrate thickness;
   a light separation device that is placed in a light path from the light source to the spherical aberration correcting device;
   a first light detector that receives light that has been separated by the light separation device; and
   a second light detector that receives light that has been reflected by the optical recording medium;
   wherein the spherical aberration correcting device is an optical element comprising a phase change layer placed between a pair of substrates having transparent conductive thin films.

22. The optical head according to claim 21, wherein light that is made incident on the phase change layer is converted to diverging light or converging light by the phase change layer.

23. The optical head according to claim 21, wherein the optical head further comprises a base-substrate thickness detection device that detects a base substrate thickness of the optical recording medium.

24. The optical head according to claim 23, wherein the base-substrate thickness detection device comprises:
   a light source;
   a lens that converges light released from the light source on the optical recording medium; and
   a light detector that detects light that has been reflected by the optical recording medium.

25. The optical head according to claim 23, wherein the base-substrate thickness detection device detects information relating to the base-substrate thickness. based upon two focal points of a first light ray on the side closer to a light axis of light and a second light ray on the outside of the first light ray.

26. The optical head according to claim 21, wherein the objective lens has an NA of not less than 0.6.

27. The optical head according to claim 21, wherein the light source has a wavelength of not more than 450 nm.

28. An optical recording and reproducing apparatus performing recording andlor reproducing of a signal to an optical recording medium, comprising the optical head according to claim 1.

* * * * *

UNITED STATES PATENT AND TRADEMARK OFFICE
CERTIFICATE OF CORRECTION

| | | |
|---|---|---|
| PATENT NO. | : 7,254,107 B2 | Page 1 of 1 |
| APPLICATION NO. | : 10/817836 | |
| DATED | : August 7, 2007 | |
| INVENTOR(S) | : Hidenori Wada et al. | |

It is certified that error appears in the above-identified patent and that said Letters Patent is hereby corrected as shown below:

<u>Column 24</u>

Line 43, "thickness." should read --thickness--.

Line 52, "andlor" should read --and/or--.

Signed and Sealed this

Eleventh Day of March, 2008

JON W. DUDAS
*Director of the United States Patent and Trademark Office*